United States Patent
Huang

(10) Patent No.: US 8,186,687 B2
(45) Date of Patent: May 29, 2012

(54) CARTRIDGE SEAL DEVICE

(75) Inventor: Yi-Chieh Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 69 days.

(21) Appl. No.: 12/649,486

(22) Filed: Dec. 30, 2009

(65) Prior Publication Data

US 2011/0156358 A1    Jun. 30, 2011

(51) Int. Cl.
*F16J 15/34*    (2006.01)

(52) U.S. Cl. .......................... 277/363; 277/373; 277/408

(58) Field of Classification Search .................. 277/361, 277/363, 366, 373, 408
See application file for complete search history.

(56) References Cited

U.S. PATENT DOCUMENTS

| | | | | |
|---|---|---|---|---|
| 3,068,014 A * | 12/1962 | Wilkinson | ..................... | 277/399 |
| 3,250,539 A * | 5/1966 | Kurz et al. | ..................... | 277/373 |
| 3,612,548 A * | 10/1971 | Tracy | ........................... | 277/385 |
| 3,782,739 A * | 1/1974 | Kahanek et al. | ............. | 277/408 |
| 3,877,706 A * | 4/1975 | Haas et al. | ..................... | 277/366 |
| 3,888,495 A * | 6/1975 | Mayer | ........................... | 277/366 |
| 3,931,978 A * | 1/1976 | Grimston | ....................... | 277/385 |
| 4,094,513 A * | 6/1978 | Kime et al. | .................... | 277/366 |
| 4,103,907 A * | 8/1978 | Inouye et al. | ................. | 277/400 |
| 4,202,553 A * | 5/1980 | Kropp | ........................... | 277/366 |
| 4,213,618 A * | 7/1980 | Thurber | ........................ | 277/373 |
| 4,361,334 A * | 11/1982 | Amorese et al. | .............. | 277/405 |
| 4,377,290 A * | 3/1983 | Netzel | ............................ | 277/368 |
| 4,545,588 A * | 10/1985 | Nagai et al. | .................... | 277/348 |
| 5,375,853 A * | 12/1994 | Wasser et al. | ................. | 277/366 |
| 5,409,240 A * | 4/1995 | Ballard | .......................... | 277/366 |
| 5,655,780 A * | 8/1997 | Gambrill et al. | .............. | 277/549 |
| 5,713,576 A * | 2/1998 | Wasser et al. | ................. | 277/304 |
| 6,250,876 B1 * | 6/2001 | Høgholt | .......................... | 415/17 |
| 6,267,382 B1 * | 7/2001 | Auber | ............................ | 277/390 |
| 6,935,633 B2 * | 8/2005 | Huang | ........................... | 277/372 |
| 7,204,490 B2 * | 4/2007 | Huang | ........................... | 277/372 |
| 7,699,579 B2 * | 4/2010 | Yandle, II | ......................... | 415/1 |
| 2008/0111314 A1 * | 5/2008 | Huang | ........................... | 277/354 |
| 2009/0212503 A1 * | 8/2009 | Huang | ........................... | 277/513 |

FOREIGN PATENT DOCUMENTS

GB    2256238 A   * 12/1992
TW    204360       10/2001

* cited by examiner

*Primary Examiner* — Vishal Patel

(74) *Attorney, Agent, or Firm* — Pearl Cohen Zedek Latzer, LLP

(57) ABSTRACT

A cartridge seal device includes a sleeve, a gland unit, a first seal unit, a pumping ring, and a second seal unit. The gland unit includes a first gland and a second gland. The first seal unit includes a first rotary ring disposed around the sleeve and rotatable along with the sleeve, a first stationary ring abutting against the first rotary ring, a compression ring abutting against the first stationary ring, and at least one first spring disposed within a retaining slot of the first gland and abutting against the compression ring. The first stationary ring has one end in abutment with the first rotary ring, and an opposite end formed with at least one notch. The compression ring has aligned guide pieces extending respectively into the notch of the first stationary ring and an engaging recess of the first gland.

12 Claims, 6 Drawing Sheets

CARTRIDGE SEAL DEVICE

BACKGROUND OF THE INVENTION

1. Field of the Invention

The invention relates to a cartridge seal device, more particularly to a cartridge seal device for a rotary shaft.

2. Description of the Related Art

A seal device is usually mounted on a stuffing box of a pumping machine so as to prevent leakage of fluid stirred in a chamber of the pumping machine due to high pressure in the chamber. When the fluid to be processed is volatile, toxic, and/or corrosive, a dual seal device should be used.

Referring to FIGS. 1 and 2, a conventional dual seal device 2 disclosed in Taiwanese Utility Model No. M204360 includes a sleeve 21 sleeved on a rotary shaft 10 of a pumping machine 1, a first seal unit 22 disposed around the sleeve 21 and within a stuffing box 12 of the pumping machine 1, a first collar 23 disposed around the sleeve 21 proximate to an end of the stuffing box 12 and connected to the first seal unit 22, a gland 24 locked to the pumping machine 1 and abutting against the first collar 23, a second seal unit 25 disposed around the sleeve 21 and within the gland 24, and a second collar 26 disposed around the sleeve 21 and outside the gland 24.

The first seal unit 22 includes a first rotary ring 221 connected to the sleeve 21 via fastening pins 223, a first stationary ring 222, and a first abutting ring 224 having a first end portion abutting against the first rotary ring 221 and a second end portion extending into the first stationary ring 222. The first collar 23 is provided with a plurality of springs 231 disposed at an end portion of the first collar 23 proximate to the first seal unit 22 and abutting against the first stationary ring 222. The gland 24 has a through hole 241 for permitting the sleeve 21 to pass therethrough, a receiving groove 242 proximate to the first collar 23 and communicated with the through hole 241, and an inlet 243 and an outlet 244 fluidly communicated with the receiving groove 242.

The second seal unit 25 includes a second rotary ring 251 surrounding and rotatable with the sleeve 21, a second stationary ring 252 disposed around the sleeve 21 and having a first end portion received in the through hole 241 and a second end portion received in the receiving groove 242, and a second abutting ring 253 having a first end portion extending into the second rotary ring 251 and a second end portion abutting against the second stationary ring 252. The second rotary ring 251 is formed with a plurality of guiding recesses 255 at an outer peripheral surface thereof. A plurality of springs 254 are disposed between the second stationary ring 252 and the gland 24.

In operation, the pressure in the pumping machine 1 will increase when the liquid in the pumping machine 1 is pumped by rotating the rotary shaft 10. At this time, the first abutting ring 224 abuts against the first rotary ring 221 by the urging of the springs 231 between the first collar 23 and the first seal unit 22, and the second stationary ring 252 abuts against the second abutting ring 253 by the urging of the springs 254 between the second seal unit 25 and the gland 24 so as to achieve a leakage proof effect. Furthermore, since the second rotary ring 251 is formed with the guiding recesses 255, a cooling fluid can be guided to flow into the receiving groove 242 via the inlet 243 and then exit from the outlet 244 fast and smoothly so as to achieve a satisfactory cooling effect.

However, the first rotary ring 221 is connected to the sleeve 21 via the fastening pins 223, and is radially urged by an inward-bent edge 212 of a collar 211 of the sleeve 21 and a washer 226 so as to be positioned around the sleeve 21 and to rotate with the sleeve 21 when the rotary shaft 20 is rotated. The first rotary ring 221 is liable to break due to the centrifugal force produced during the rotation of the sleeve 21 and the urging force from the inward-bent edge 212 and the springs 231. Furthermore, the first rotary ring 221 and the first abutting ring 224 are merely urged by the springs 231, which may cause positional deviation of the first abutting ring 224 relative to the first rotary ring 221, which in turn reduces the leakage proof effect. Additionally, the first stationary ring 222 is connected to the first collar 23 by extending guiding pieces 225 of the first stationary ring 222 through a compression ring 27 and a washer 28 and then inserting the guiding pieces 225 into positioning grooves 232 of the first collar 23. The service life of the first stationary ring 222 may be reduced due to the interference of the aforesaid complicated transmission mechanism.

SUMMARY OF THE INVENTION

Therefore, an object of the present invention is to provide a cartridge seal device which has improved leakage proof effect, higher transmission stability, and extended service life.

Accordingly, the cartridge seal device for a rotary shaft of this invention includes a sleeve, a gland unit, a first seal unit, a pumping ring, and a second seal unit. The sleeve is for extension of the rotary shaft therethrough and has inner and outer end portions. The gland unit is disposed around the sleeve and includes a first gland, and a second gland having one end in abutment with the first gland. The first gland has at least one first retaining hole that faces to the inner end portion of the sleeve, and at least one engaging recess that faces to the sleeve. The second gland has an axial hole for extension of the sleeve, a fluid chamber in fluid communication with the axial hole, a fluid port communicated with the fluid chamber, and at least one second retaining hole that faces to the inner end portion of the sleeve. The first seal unit is disposed around the sleeve and is connected to the first gland. The first seal unit includes a first rotary ring disposed around the sleeve and rotatable along with the sleeve, a first stationary ring abutting against the first rotary ring, a compression ring abutting against the first stationary ring, and at least one first spring disposed within the first retaining hole and abutting against the compression ring. The first stationary ring has one end in abutment with the first rotary ring, and an opposite end formed with at least one notch that faces to the compression ring. The compression ring has aligned guide pieces that project from two opposite sides of the compression ring and that extend respectively into the notch of the first stationary ring and the engaging recess of the first gland. The pumping ring is disposed around the sleeve within the second gland. The second seal unit is disposed around the sleeve and is connected to the pumping ring and the second gland. The second seal unit has a second rotary ring connected between the pumping ring and the sleeve, a second stationary ring abutting against the second rotary ring, and at least one second spring disposed within the second retaining hole and abutting against the second stationary ring.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
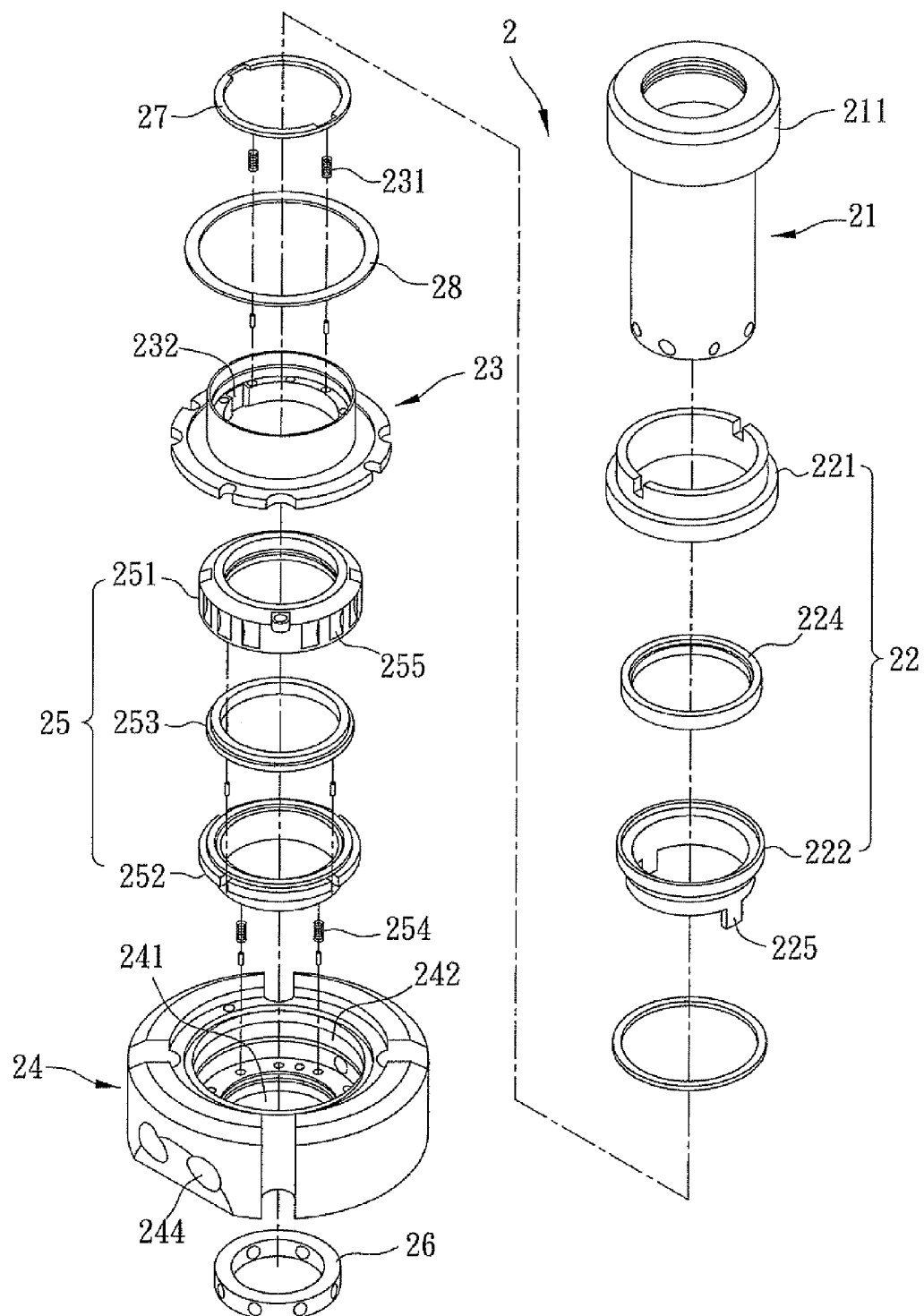
FIG. 1 is an exploded perspective view of a conventional seal device.
Figure 2:
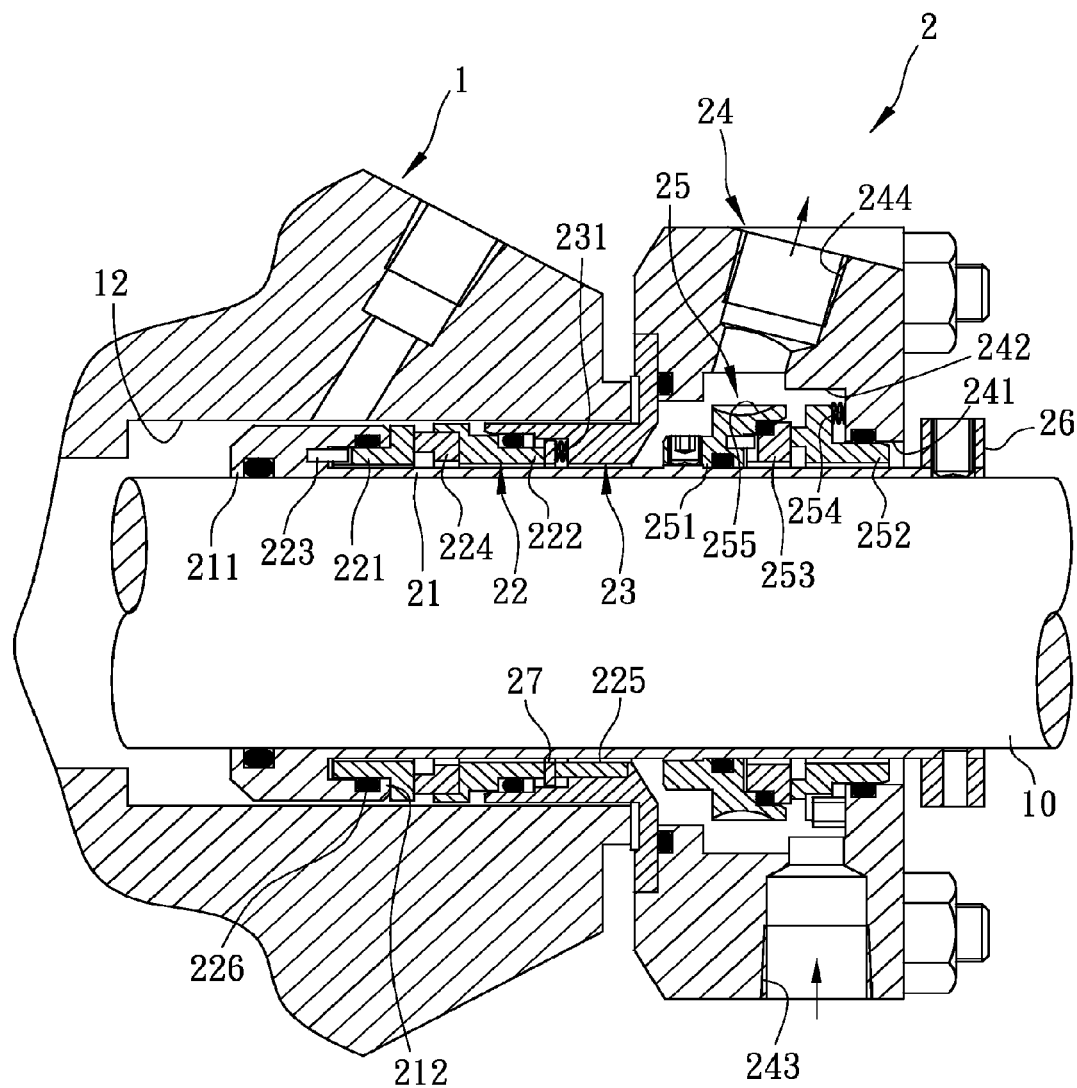
FIG. 2 is a sectional view of the conventional seal device.

Before the present invention is described in greater detail, it should be noted that like elements are denoted by the same reference numerals throughout the disclosure.

Figure 3:
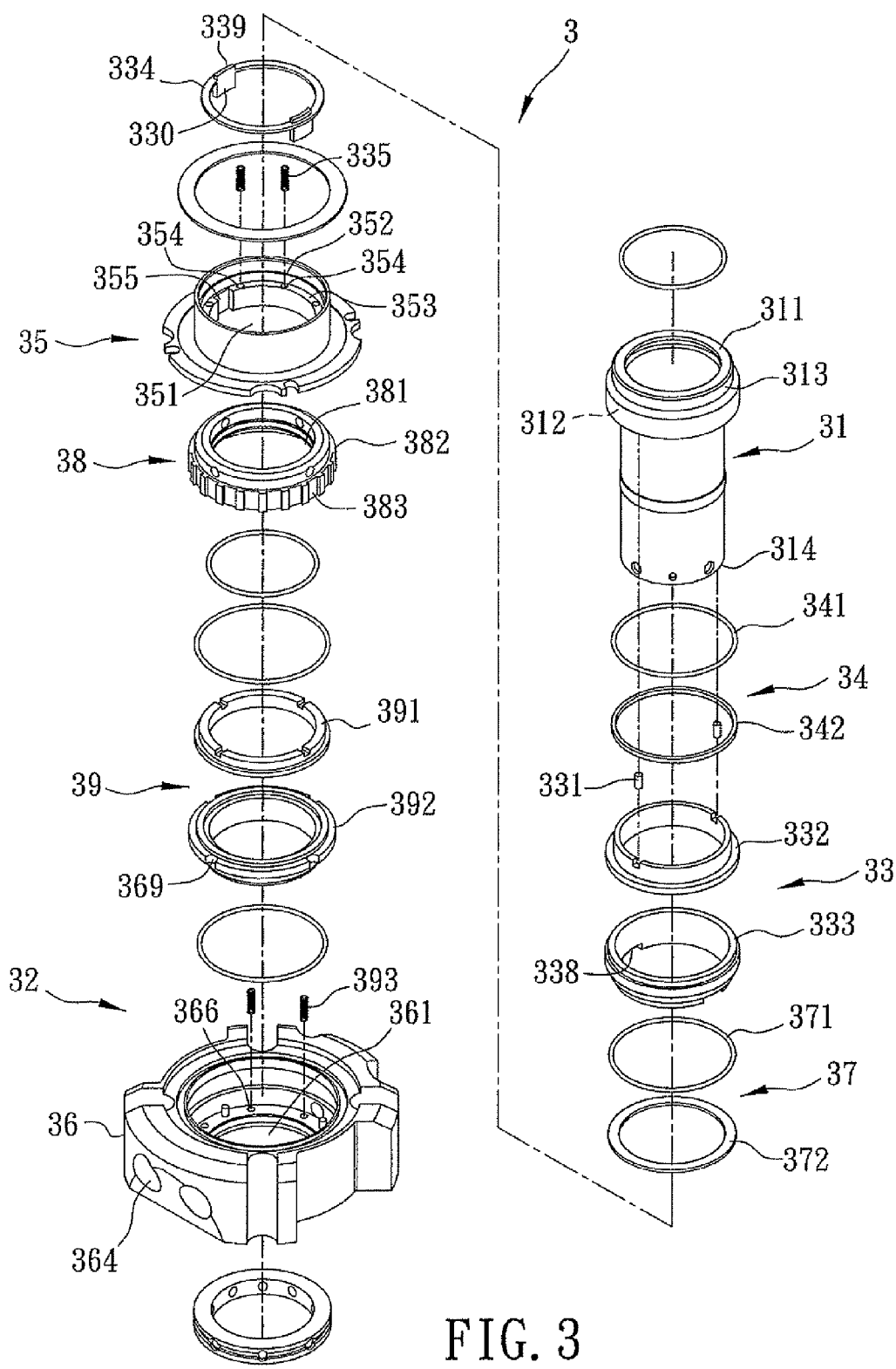
FIG. 3 is an exploded perspective view of a first preferred embodiment of a cartridge seal device according to this invention.
Figure 4:
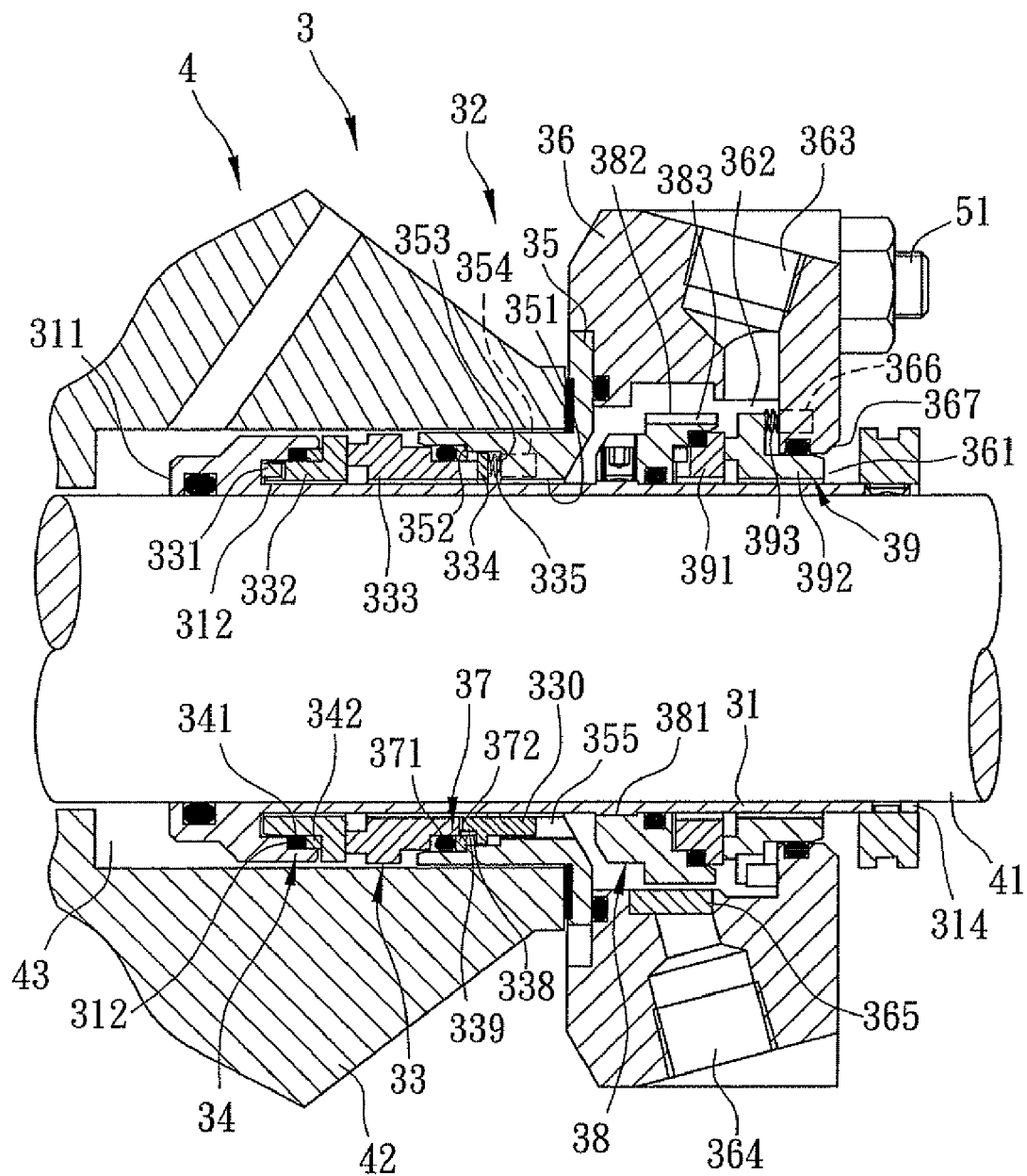
FIG. 4 is a sectional view of the first preferred embodiment.

Referring to FIGS. 3 and 4, the first preferred embodiment of a cartridge seal device 3 according to this invention is used for a rotary shaft 41 of a pumping machine 4, and includes a sleeve 31, a gland unit 32, a first seal unit 33, a first sealing part 34, a second sealing part 37, a pumping ring 38, and a second seal unit 39.

The sleeve 31 is for extension of the rotary shaft 41 therethrough, and has inner and outer end portions 311, 314, and an end cap 313 formed on the inner end portion 311 and confining an annular groove 312. It should be noted that the end cap 313 and the sleeve 31 can be formed integrally, or can be formed separately and then connected to each other. In this preferred embodiment, the end cap 313 and the sleeve 31 can be formed integrally.

The gland unit 32 is disposed around the sleeve 31, and includes a first gland 35, and a second gland 36 having one end in abutment with the first gland 35. The first gland 35 has an axial hole 351 for extension of the sleeve 31, a first step surface 352 and a second step surface 353 facing toward the inner end portion 311 of the sleeve 31, a plurality of first retaining holes 354 that face to the inner end portion 311 of the sleeve 31, and a plurality of engaging recesses 355 that face to the sleeve 31.

The second gland 36 has an axial hole 361 for extension of the sleeve 31, a fluid chamber 362 in fluid communication with the axial hole 361, a fluid inlet port 363 communicated with the fluid chamber 362, a fluid outlet port 364 communicated with the fluid chamber 362, and a plurality of second retaining holes 366 that face to the inner end portion 311 of the sleeve 31. A guiding plate 365 is disposed proximate to the fluid outlet port 364 in the fluid chamber 362. Alternatively, the guiding plate can be disposed proximate to the fluid inlet port 363. The guiding plate 365 is inclined so as to guide cooling fluid to flow smoothly in the fluid chamber 362 via the fluid inlet port 363 and to exit smoothly out of the fluid chamber 362 via the fluid outlet port 364 so as to enhance heat dissipation efficiency. The second gland 36 further has an annular inner surface with an outwardly slanting end portion 367 proximate to the outer end portion 314 of the sleeve 31.

It should be noted that the first and second glands 35, 36 can be formed integrally as one piece.

The first seal unit 33 is disposed around the sleeve 31 and is connected to the first gland 35. The first seal unit 33 includes a first rotary ring 332 disposed around the sleeve 31 and rotatable along with the sleeve 31, a first stationary ring 333 abutting against the first rotary ring 332, a compression ring 334 abutting against the first stationary ring 333, and a plurality of first springs 335 disposed within the first retaining holes 354 and abutting against the compression ring 334. The first rotary ring 332 is inserted into the annular groove 312 of the end cap 313, and is pinned to the end cap 313 using positioning pins 331. The first stationary ring 333 has one end in abutment with the first rotary ring 332, and an opposite end formed with a plurality of notches 338 that face to the compression ring 334. The compression ring 334 has aligned guide pieces 339, 330 that project from two opposite sides of the compression ring 334 and that extend respectively into the notches 338 of the first stationary ring 333 and the engaging recesses 355 of the first gland 35.

The first sealing part 34 is disposed inside the annular groove 312 of the end cap 313 and between the end cap 313 of the sleeve 31 and the first rotary ring 332. The first sealing part 34 has a first fluid sealing ring 341 and a packing ring 342 in abutment with the first fluid sealing ring 341. In this preferred embodiment, the packing ring 342 is made of a heat-insulating material (e.g., polytetrafluoroethylene) so as to avoid deformation of the first fluid sealing ring 341.

The second sealing part 37 is disposed between the first stationary ring 333 and the first gland 35, and includes a second fluid sealing ring 371, and a backing ring 372 in abutment between the second fluid sealing ring 371 and the first step surface 352 of the first gland 35.

The pumping ring 38 is disposed around the sleeve 31 within the second gland 36, and has a through hole 381 for extension of the sleeve 31, and an outer peripheral surface 382 formed with a plurality of fluid pumping grooves 383.

The second seal unit 39 is disposed around the sleeve 31 and is connected to the pumping ring 38 and the second gland 36. The second seal unit 39 has a second rotary ring 391 connected between the pumping ring 38 and the sleeve 31, a second stationary ring 392 abutting against the second rotary ring 391, and a plurality of second springs 393 disposed within the second retaining holes 366 and abutting against the second stationary ring 392. Since the end portion 367 of the annular inner surface of the second gland 36 slants outwardly, the contact surface area between the outer surface of the second stationary ring 392 and the annular inner surface of the second gland 36 is decreased, and the wear caused to the second stationary ring 392 can be reduced. Therefore, the service lives of these components can be extended.

In use, the second gland 36 is connected to a seal box 42 of the pumping machine 4 using a bolt 51. The seal box 42 has a stuffing box 43 for receiving the sleeve 31, the first gland 35, the first seal unit 33, and the first sealing part 34. Since the sleeve 31 is fittingly sleeved around the rotary shaft 41, the sleeve 31, as well as the first rotary ring 332, the first sealing part 34, the second rotary ring 391, and the pumping ring 38, which are disposed around the sleeve 31, are rotatable along with the rotary shaft 41. Furthermore, since the pumping ring 38 and the second rotary ring 391 are rotatable along with the sleeve 31, and since the outer peripheral surface 382 of the pumping ring 38 is formed with the fluid pumping grooves 383, the cooling fluid can be guided fast to flow smoothly in the fluid chamber 362 via the fluid inlet port 363 and to exit smoothly out of the fluid chamber 362 via the fluid outlet port 364 so as to enhance heat dissipation efficiency.

Additionally, as compared to the conventional seal device 2 in which the first abutting ring 224 and the first stationary ring 222 are used in the first seal unit 22, use of the first stationary ring 333 in the first seal unit 33 of the cartridge seal device 3 of the present invention can improve the transmission stability and the service life since the number of components involved during transmission is reduced and the problem of the wear between the first abutting ring 224 and the first rotary ring 221 can be avoided.

Figure 5:
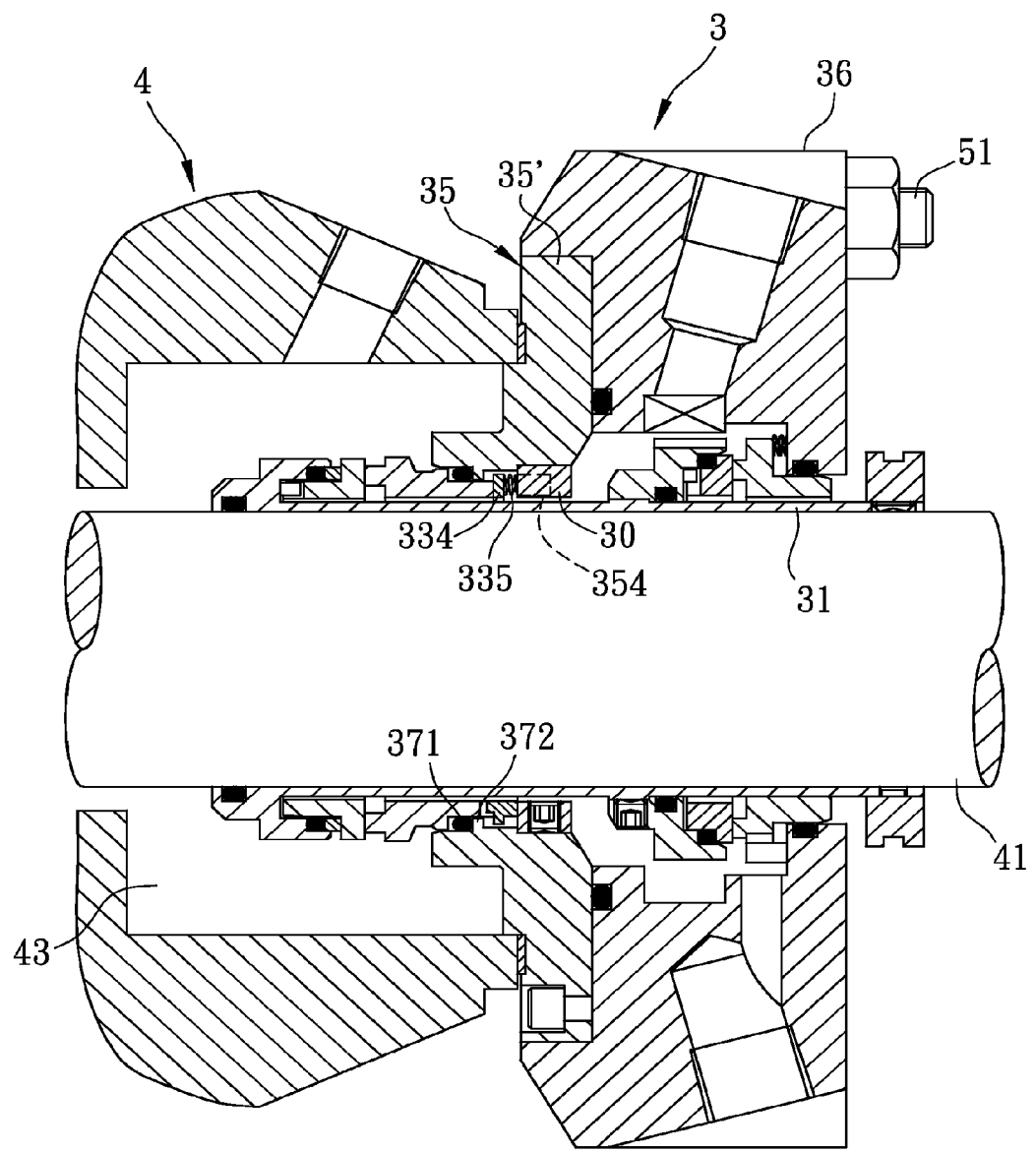
FIG. 5 is a sectional view of a second preferred embodiment of a cartridge seal device according to this invention.

Referring to FIG. 5, the second preferred embodiment of a cartridge seal device 3 according to this invention is used for a pumping machine 4 having a relatively large stuffing box 43, and is similar to the first preferred embodiment except that the first gland 35 further has a gland body 35' and a retaining ring 30 disposed between an outer surface of the sleeve 31 and an inner surface of the gland body 35'. The first retaining holes 354 and the first springs 335 are disposed in the retaining ring 30. Each of the first springs 335 has two ends abutting against the compression ring 334 and the retaining ring 30, respectively. Furthermore, the first gland 35 and the backing ring 372 are formed integrally in this preferred embodiment.

In assembly, the compression ring 334 is disposed in the first gland 35 and the first springs 335 are disposed in the retaining ring 30. The retaining ring 30 is then positioned in the first gland 35 so as to form a transmission assembly including the compression ring 334, the first springs 335, the retaining ring 30, and the first gland 35. When the cartridge seal device 3 is maintained, the cartridge seal device 3 is disassembled from the rotary shaft 41 by removing the bolt 51. The second gland 36 is then removed from the first gland 35 to obtain the transmission assembly, which can be repaired as a module, if required.

Figure 6:
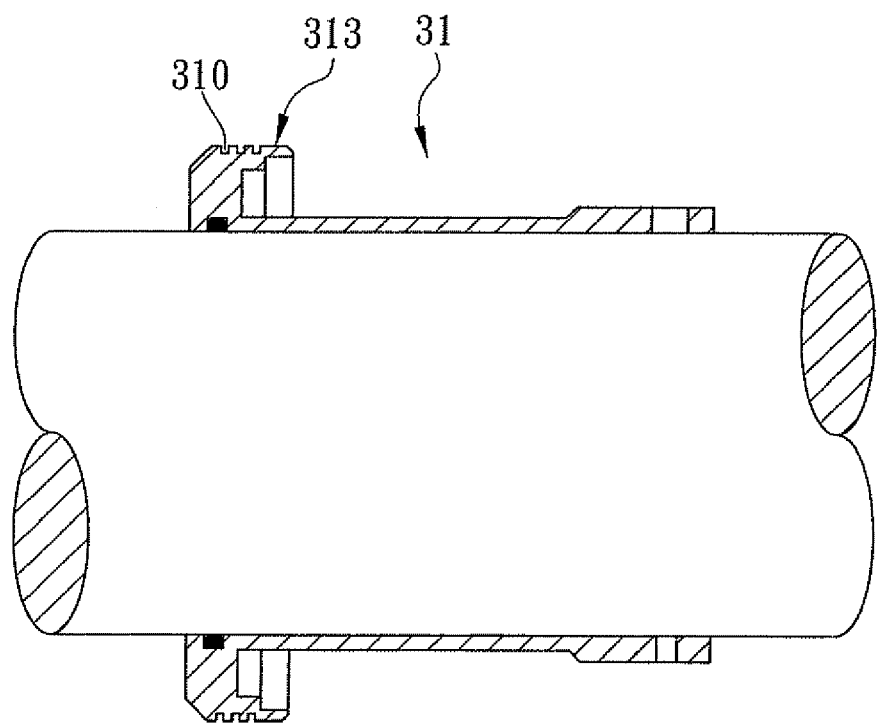
FIG. 6 is a sectional view of a sleeve used in a third preferred embodiment of a cartridge seal device according to this invention.
Figure 7:
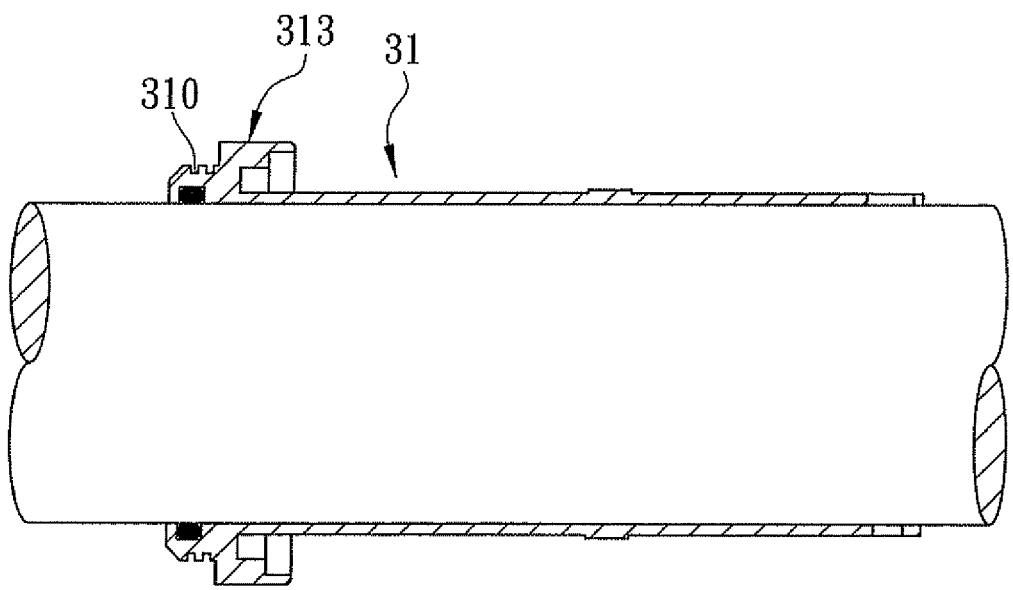
FIG. 7 is a sectional view of another example of a sleeve used in the third preferred embodiment.

Referring to FIGS. 6 and 7, the third preferred embodiment of a cartridge seal device according to this invention is substantially identical to the first preferred embodiment except that the end cap 313 of the sleeve 31 has an outer peripheral surface formed with a spiral groove 310.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cartridge seal device for a rotary shaft, comprising:
   a sleeve for extension of the rotary shaft therethrough, and having inner and outer end portions and an end cap formed on said inner end portion and confining an annular groove around said inner end portion;
   said end cap of said sleeve has an outer peripheral surface formed with a spiral groove;
   a gland unit disposed around said sleeve and including a first gland, and a second gland having one end in abutment with said first gland, said first gland having at least one engaging recess that face to said sleeve, said second gland having an axial hole for extension of said sleeve, a fluid chamber in fluid communication with said axial hole, and at least one fluid port communicated with said fluid chamber;
   said second gland has an annular inner surface in contact with an outer surface of said second stationary ring, said annular inner surface of said second gland having an outwardly slanting end portion proximate to said outer end portion of said sleeve;
   a first seal unit disposed around said sleeve and connected to said first gland, said first seal unit including a first rotary ring disposed around said sleeve, rotatable along with said sleeve, and inserted into said annular groove, a first stationary ring abutting against said first rotary ring, a compression ring abutting against said first stationary ring, and at least one first spring disposed between said first gland and said compression ring and abutting against said compression ring, said first stationary ring having one end in abutment with said first rotary ring, and an opposite end formed with at least one notch that faces to said compression ring, said compression ring having aligned guide pieces that project from two opposite sides of said compression ring and that extend respectively into said notch of said first stationary ring and said engaging recess of said first gland;
   a pumping ring disposed around said sleeve within said second gland;
   a second seal unit disposed around said sleeve and connected to said pumping ring and said second gland, said second seal unit having a second rotary ring connected between said pumping ring and said sleeve, a second stationary ring abutting against said second rotary ring, and at least one second spring disposed between said second gland and said second stationary ring and abutting against said second stationary ring; and
   a first sealing part disposed inside said annular groove and between said end cap and said first rotary ring, said first sealing part having a first fluid sealing ring and a packing ring made of heat-insulating material in abutment with said first fluid sealing ring.

2. The cartridge seal device as claimed in claim 1, wherein said first rotary ring is pinned to said end cap.

3. The cartridge seal device as claimed in claim 1, further comprising a second sealing part disposed between said first stationary ring and said first gland.

4. The cartridge seal device as claimed in claim 1, wherein said pumping ring has an outer peripheral surface formed with at least one fluid pumping groove.

5. The cartridge seal device as claimed in claim 1, wherein said first gland further has a gland body and a retaining ring disposed between an outer surface of said sleeve and an inner surface of said gland body, said first spring having two ends abutting against said compression ring and said retaining ring, respectively.

6. The cartridge seal device as claimed in claim 1, wherein said first and second glands are formed integrally as one piece.

7. The cartridge seal device as claimed in claim 1, wherein said first gland further has at least one first retaining hole that faces to said inner end portion of said sleeve, said first spring being disposed within said first retaining hole.

8. The cartridge seal device as claimed in claim 1, wherein said second gland further has at least one second retaining hole that faces to said inner end portion of said sleeve, said second spring being disposed within said second retaining hole.

9. The cartridge seal device as claimed in claim 3, wherein said second sealing part includes a second fluid sealing ring, and a backing ring in abutment with said second fluid sealing ring.

10. The cartridge seal device as claimed in claim 5, wherein said first gland further has at least one first retaining hole that faces to said inner end portion of said sleeve, said first retaining hole and said first spring being disposed in said retaining ring.

11. The cartridge seal device as claimed in claim 1, wherein said second gland further includes a guiding plate disposed proximate to said fluid port.

12. The cartridge seal device as claimed in claim 9, wherein said first gland and said backing ring are formed integrally.

* * * * *